United States Patent
Kawamura et al.

(10) Patent No.: US 10,084,901 B2
(45) Date of Patent: Sep. 25, 2018

(54) CORDLESS TELEPHONE APPARATUS AND CORDLESS TELEPHONE SYSTEM

(71) Applicant: PANASONIC INTELLECTUAL PROPERTY MANAGEMENT CO., LTD., Osaka (JP)

(72) Inventors: Tsuyoshi Kawamura, Fukuoka (JP); Yoshihiro Shirakawa, Fukuoka (JP); Kouji Abe, Fukuoka (JP); Daijiro Matsuyama, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 199 days.

(21) Appl. No.: 14/844,161

(22) Filed: Sep. 3, 2015

(65) Prior Publication Data

US 2016/0072939 A1 Mar. 10, 2016

(30) Foreign Application Priority Data

Sep. 9, 2014 (JP) .................................. 2014-182964

(51) Int. Cl.
*H04M 1/725* (2006.01)
*H04M 3/02* (2006.01)
(Continued)

(52) U.S. Cl.
CPC ......... *H04M 1/72505* (2013.01); *H04M 1/64* (2013.01); *H04M 1/7255* (2013.01);
(Continued)

(58) Field of Classification Search
CPC .. H04M 1/72505; H04M 1/7255; H04M 3/02; H04M 3/54
See application file for complete search history.

(56) References Cited

U.S. PATENT DOCUMENTS 5,915,224 A * 6/1999 Jonsson ................ H04M 1/725
379/211.01
5,956,632 A * 9/1999 Shon ..................... H04M 1/575
379/142.01

(Continued)

FOREIGN PATENT DOCUMENTS

EP 2822260 1/2015
JP 8-331261 12/1996
(Continued)

OTHER PUBLICATIONS

The Extended European Search Report dated Feb. 5, 2016 for the related European Patent Application No. 5180486.1.

*Primary Examiner* — Muthuswamy Manoharan
(74) *Attorney, Agent, or Firm* — Greenblum & Bernstein, P.L.C.

(57) ABSTRACT

A cordless base unit includes a controller that performs control in a case where an incoming call arrives from the landline telephone network, in such a manner that the cordless handset and the mobile information terminal perform sound ringing for the incoming call, that automatic answering starts after a predetermined time has elapsed and the sound ringing for the incoming call is stopped except for the mobile information terminal that is set to be used outside of the house, and that while the automatic answering is performed, the mobile information terminal that is set to be used outside of the house continues to perform the sound ringing for the incoming call.

12 Claims, 12 Drawing Sheets

(51) Int. Cl.
*H04M 3/54* (2006.01)
*H04M 1/64* (2006.01)

(52) U.S. Cl.
CPC ... *H04M 1/72502* (2013.01); *H04M 1/72508* (2013.01); *H04M 3/02* (2013.01); *H04M 3/54* (2013.01); *H04M 2250/08* (2013.01)

(56) References Cited

U.S. PATENT DOCUMENTS

| | | | |
|---|---|---|---|
| 6,788,677 B1 | 9/2004 | Fukuyama et al. | |
| 2003/0078071 A1 | 4/2003 | Uchiyama | |
| 2003/0092451 A1* | 5/2003 | Holloway | H04M 3/54 455/461 |
| 2005/0018653 A1* | 1/2005 | Phillips | H04W 4/16 370/352 |
| 2005/0070272 A1 | 3/2005 | Marangos | |
| 2010/0144341 A1* | 6/2010 | Robbins | H04W 4/16 455/426.1 |
| 2010/0291928 A1* | 11/2010 | Valdez | H04M 1/72505 455/436 |
| 2011/0164660 A1* | 7/2011 | Hosono | H04W 24/02 375/140 |
| 2013/0054952 A1* | 2/2013 | Shen | G06F 9/441 713/2 |
| 2014/0256314 A1* | 9/2014 | Zhang | H04W 76/025 455/426.2 |
| 2014/0362839 A1 | 12/2014 | Fukuda et al. | |

FOREIGN PATENT DOCUMENTS

| | | |
|---|---|---|
| JP | 11-355358 | 12/1999 |
| JP | 2007-221458 | 8/2007 |
| JP | 5438236 B | 3/2014 |

* cited by examiner

CORDLESS TELEPHONE APPARATUS AND CORDLESS TELEPHONE SYSTEM

BACKGROUND OF THE INVENTION

1. Field of the Invention

The present invention relates to a cordless telephone apparatus and a cordless telephone system, which are capable of using a mobile information terminal as a handset of a cordless telephone also outside of a house.

2. Description of the Related Art

In recent years, as household landline telephones, cordless types that are capable of being placed in a living room, a kitchen, a bedroom, and the like and being used as handsets, have been in wide use. Because the mere addition of a dedicated handset occurs an incidental cost, a service function that enables a smartphone already in use to be used as a handset of the cordless telephone is needed.

As a method of partly realizing this service function, a technology for an apparatus that enables a client on a packet-switched network such as the Internet to receive an incoming call from a circuit-switched network is known as disclosed in Japanese Patent Unexamined Publication No. 11-355358.

However, the technology disclosed in Japanese Patent Unexamined Publication No. 11-355358 achieves a purpose of making a notification of the incoming call to all mobile information terminals that are registered with the apparatus, but consideration is not given to ease of use in a case where the mobile information terminal is also used as a handset of the cordless telephone outside of a house. For example, regardless of the mobile information terminal carried outside of the house being able to answer a call from outside of the house, because a base unit of the cordless telephone performs automatic answering earlier, the mobile information terminal cannot answer and so forth.

SUMMARY OF THE INVENTION

The present invention, which is made to solve such problems in the related art, is to provide a cordless telephone apparatus and a cordless telephone system that are capable of using mobile information terminals (which include a mobile information terminal, a smartphone, and the like) with improved ease of use as handsets of a cordless telephone outside of a house also.

According to an aspect of the present invention, there is provided a cordless telephone apparatus including a cordless base unit that is connected to a landline telephone network. The cordless base unit includes a first wireless communicator that wirelessly connects to a cordless handset, a second wireless communicator that wirelessly connects to a mobile information terminal, a memory in which setting information on whether the mobile information terminal is used outside of or inside of a house is stored, and a controller that performs control in a case where an incoming call arrives from the landline telephone network, in such a manner that the cordless handset and the mobile information terminal perform sound ringing for the incoming call, that automatic answering starts after a predetermined time has elapsed and the sound ringing for the incoming call is stopped except for the mobile information terminal that is set to be used outside of the house, and that while the automatic answering is performed, the mobile information terminal that is set to be used outside of the house continues to perform the sound ringing for the incoming call.

According to the present invention, with the configuration described above, the cordless telephone apparatus can be provided that is capable of using the mobile information terminal with improved ease of use as a handset of the cordless telephone outside of the house also.

DETAILED DESCRIPTION OF THE PREFERRED EMBODIMENTS

Figure 1:
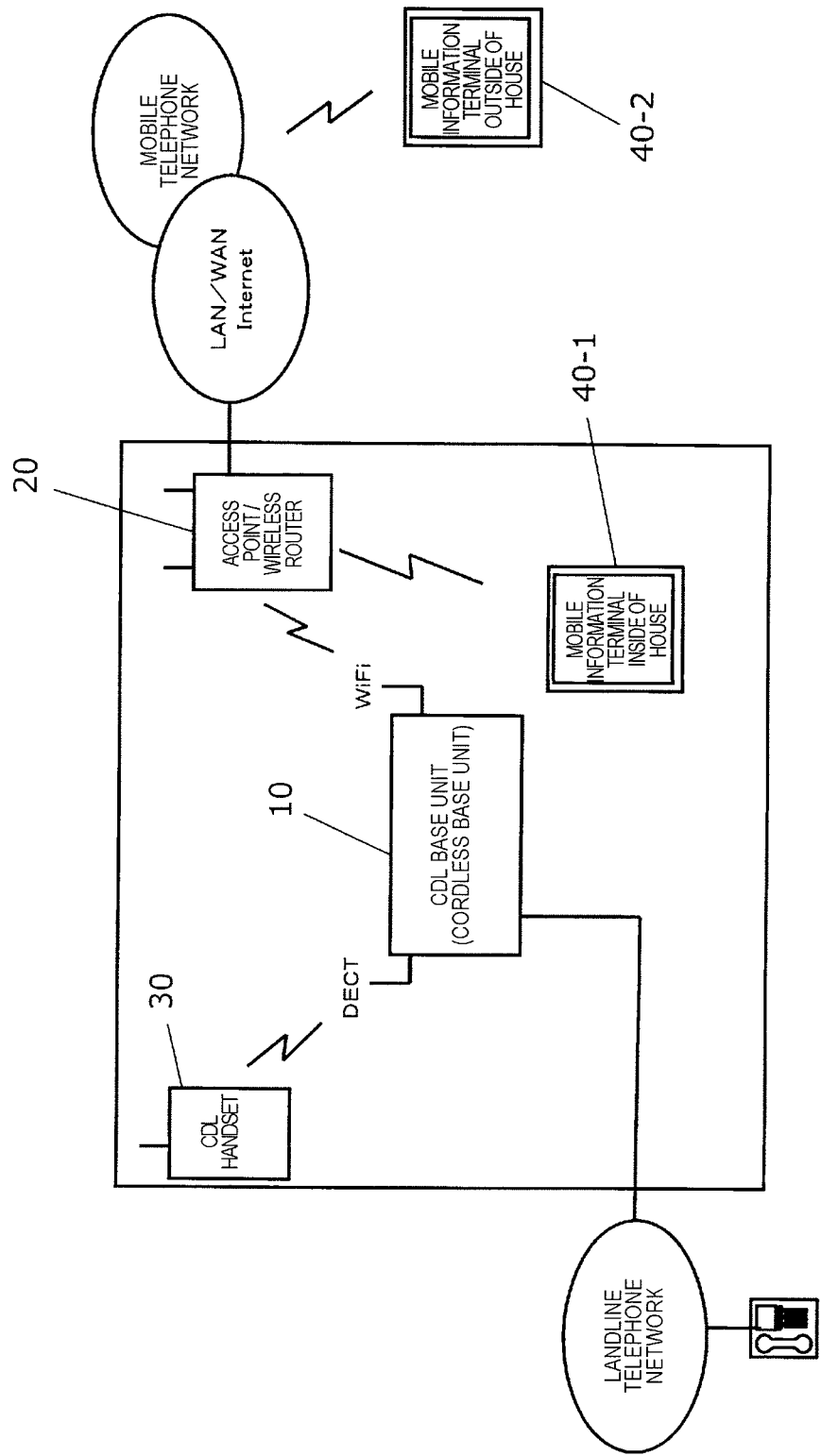
FIG. 1 is a systematic diagram illustrating an outline of a cordless telephone system according to a first exemplary embodiment of the present invention.

Embodiments of the present invention are described below referring to the drawings.

First Exemplary Embodiment

Outline of a Cordless Telephone System

FIG. 1 is a systematic diagram illustrating an outline of a cordless telephone system according to a first exemplary embodiment. A configuration of the cordless telephone system will be described below referring to FIG. 1. As described below, mobile information terminals that include a smartphone are given as examples of a mobile information terminal, but the present invention is not limited to these.

In FIG. 1, cordless base unit 10 is provided inside of a house. Cordless base unit 10 connects to the Internet through access point 20 that functions as a wireless LAN router. On the other hand, cordless base unit 10 connects to a landline telephone network. Furthermore, it is assumed that cordless handset 30 that connects to cordless base unit 10 and mobile telephone information terminals 40-1 and 40-2 that connect to access point 20 and a mobile network are present inside of the house. In a case where a specific mobile information terminal is not distinguished, mobile information terminals are collectively referred to as mobile information terminal 40.

Cordless handset 30 is capable of connecting to the landline telephone network through cordless base unit 10, and is capable of connecting to mobile information terminal 40-1 through cordless base unit 10 and access point 20. Mobile information terminal 40-1 connects to cordless base unit 10 through access point 20 over a wireless LAN. Furthermore, mobile information terminal 40-1 is capable of connecting cordless handset 30 and the landline telephone network through access point 20 and cordless base unit 10.

In a case where mobile information terminal 40 operates outside of the house, just mobile information terminal 40-2 in FIG. 1 is configured to be connected to the Internet through the mobile network or an external access point (not illustrated) on the Internet, and to be capable of connecting to cordless base unit 10 that is connected to the Internet described above.

In FIG. 1, a case where mobile information terminal 40 connects to cordless base unit 10 through access point 20 is illustrated, but cordless base unit 10 can function as a wireless LAN repeater, and mobile information terminal 40 can connect directly to cordless base unit 10, and thus, from cordless base unit 10, can connect to the Internet through access point 20.

Furthermore, an example is illustrated in which cordless handset 30 and cordless base unit 10 employ a wireless communication scheme that uses Digital Enhanced Cordless Telecommunications (DECT), but the present invention is not limited to this.

Configuration of Cordless Base Unit

Figure 2:
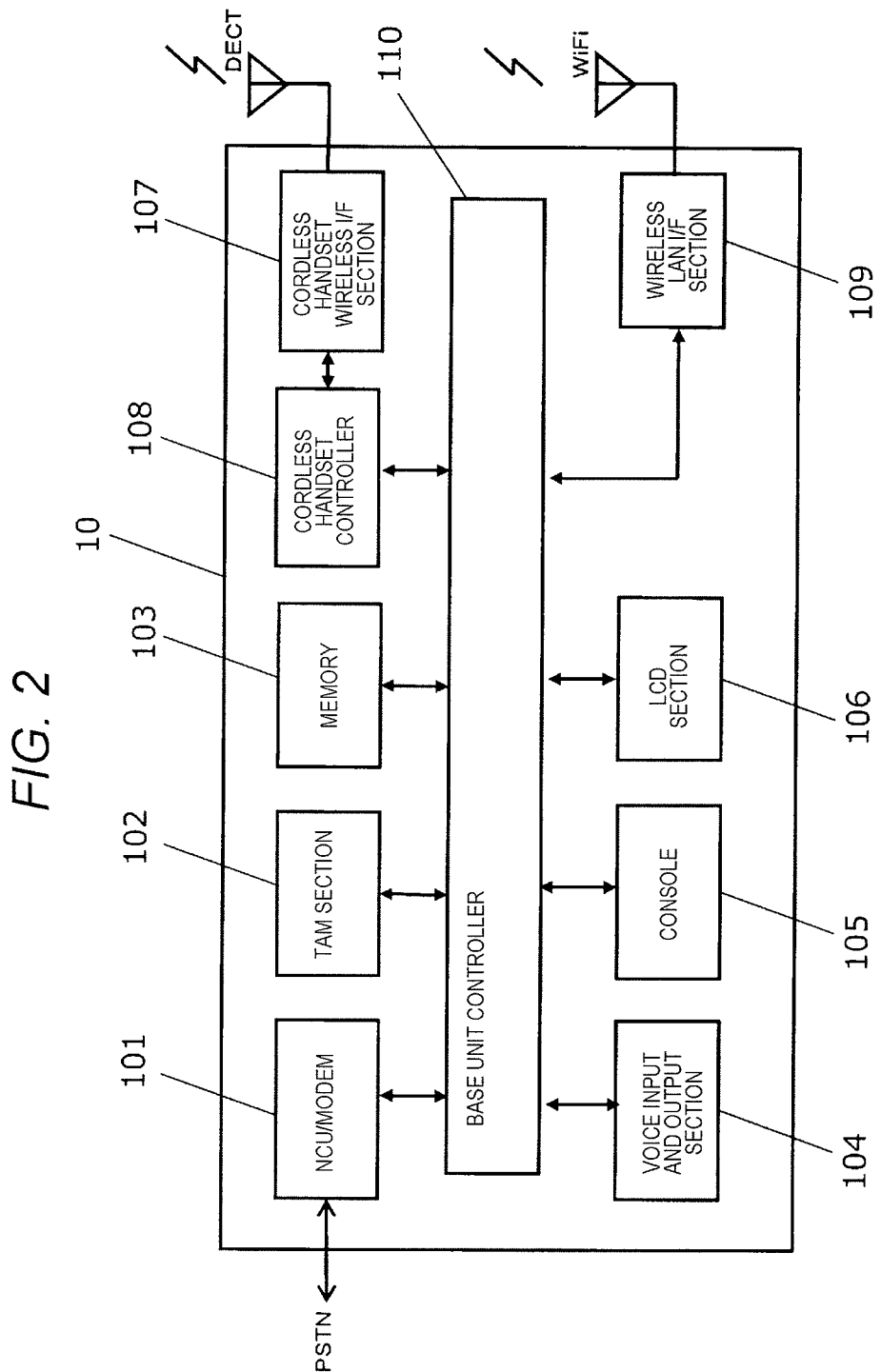
FIG. 2 is a block diagram of a base unit of the cordless telephone system according to the first exemplary embodiment of the present invention.

FIG. 2 is a block diagram of the base unit of the cordless telephone system according to the first exemplary embodiment. A configuration of cordless base unit 10 will be described below referring to FIG. 2.

NCU/modem 101 is a network control unit that performs control of a telephone network, such as connection to a public network in a case of an outgoing call and detection of an incoming call from the public network and a modem that receives caller number information from the public circuit in a case of an incoming call.

TAM section 102 is a telephone answering machine. TAM section 102 stores an answering machine message, and records and reproduces a message.

Stored in memory 103 is handset addition information that includes a handset communication history such as various pieces of setting data of a cordless telephone apparatus, telephone directory data, outgoing and incoming call history information, and an SMS message.

Furthermore, handset information is stored in memory 103. Handset information is configured from each cordless handset 30, a connected state of each cordless handset 30, a handset name, a handset number (a handset extension number or port number), incoming call sound memory information (memory capacity, or reproduction time), an in-use CODEC, and the like. The handset name and the handset number are used as the handset identification information for identifying the handset.

Moreover, in addition to information relating to cordless handset 30, handset information is for storing and managing information relating to mobile information terminal 40 as well. Particularly, handset telephone information is for storing and managing setting information on whether mobile information terminal 40 is used as mobile information terminal 40-1 inside of the house or is used as mobile information terminal 40-2 outside of the house. For example, information (a telephone number or external server information) for transmission to outside of the house is the setting information.

Voice input and output section 104 is configured from a microphone, a speaker, and a CODEC, and performs output of incoming call sound, and input and output of voice speech.

Console 105 is configured from dials that are turned by a user, and various function buttons. LCD section 106 is a display unit such as a liquid crystal display (LCD), and various pieces of information are displayed on the LCD section 106.

Cordless handset wireless I/F section 107 is a circuit for transmitting and receiving wireless data to and from cordless handset 30, and is configured from an RF/IF unit that performs frequency conversion of a wireless signal, a modulation and demodulation unit that performs modulation and demodulation, and a digital signal processing circuit that performs TDMA signal processing and the like.

Cordless handset controller 108 transmits and receives control data to and from cordless handset 30, and performs protocol control in compliance with a control protocol (for example, a DECT protocol scheme, a PHS protocol scheme, or the like) between cordless handset controller 108 and cordless handset 30, such as initiating an outgoing call and receiving an incoming call. A DECT scheme is described below as being employed in the control protocol between cordless handset controller 108 and cordless handset 30.

Wireless LAN I/F section 109 performs wireless LAN protocol control in compliance with IEEE 802.11 (Wi-Fi (a registered trademark)) and performs transmission and reception of wireless data to and from mobile information terminal 40. Wireless LAN I/F section 109 may use a short-distance wireless communication technology such as Bluetooth (a registered trademark) or ZigBee (a registered trademark).

Base unit controller 110 controls entire cordless base unit 10. Specifically, base unit controller 110 receives and interprets an event and a message that occur in each unit in the vicinity of base unit controller 110, controls states of outgoing and incoming calls and call connection, and gives an instruction to each unit.

For example, events and various messages that are received from NCU/modem 101 and cordless handset controller 108 are processed. Particularly, in a case where an incoming call arrives at NCU/modem 101 from the landline telephone network, control for various services is performed that uses a caller number accompanying the message which is received from the landline telephone network.

Furthermore, for example, with an occurrence of a timer timeout event (not illustrated), TAM section 102 is controlled and thus an answering machine message is recorded and reproduced.

Furthermore, for example, control is performed in such a manner that sound ringing for the incoming call stops or continues, referring to the setting information on whether mobile information terminal 40 is used inside of the house or is used outside of the house, which is stored in memory 103. An "outdoor telephone call" button may be provided in cordless base unit 10, and the setting information on whether the mobile information terminal 40 is used outside of the house or is used inside of the house may be set by the user pushing down on the button when the user goes outside.

Furthermore, for example, control is performed through wireless LAN I/F section 109 in such a manner that a message for stopping the sound ringing is transmitted to mobile information terminal 40.

Configuration of a Cordless Handset

Figure 3:
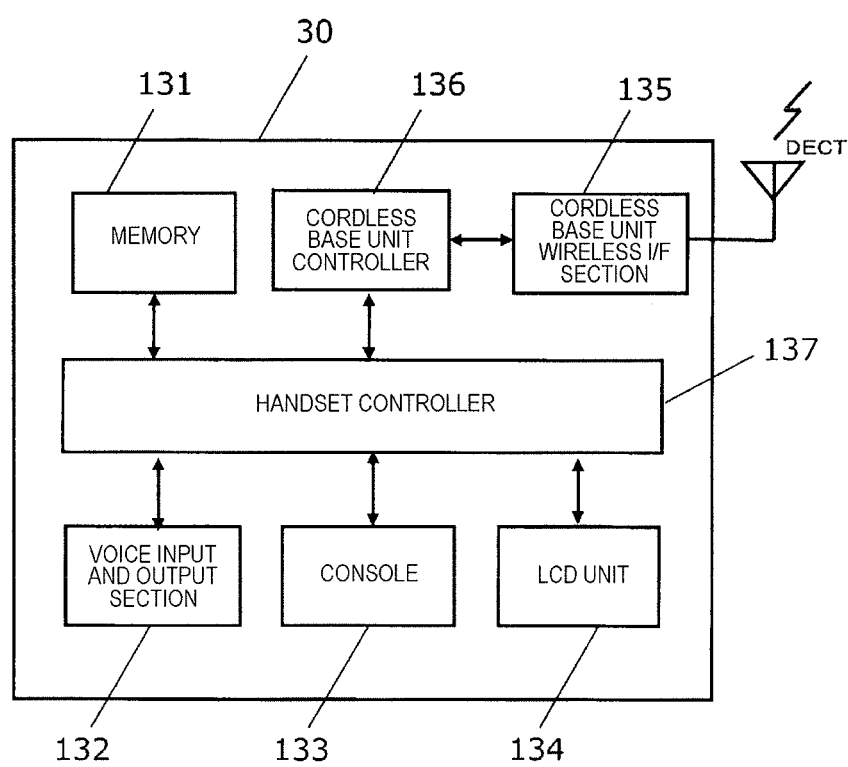
FIG. 3 is a block diagram of a handset of the cordless telephone system according to the first exemplary embodiment of the present invention.

FIG. 3 is a block diagram of the handset in the cordless telephone system according to the first exemplary embodiment. A configuration of cordless handset 30 will be described below referring to FIG. 3.

Various pieces of data, for example, such as the telephone directory data, that are used in cordless handset 30, are stored in predetermined memory areas of memory 131.

Voice input and output section 132 is configured from a microphone, a speaker, and a CODEC, and performs output of incoming call sound, and input and output of voice speech.

Console 133 is configured from dials that are turned by the user, and various function buttons. Various pieces of information are displayed on LCD section 134.

Cordless base unit wireless I/F section 135 is a circuit for transmitting and receiving wireless data to and from cordless base unit 10, and is configured from an RF/IF unit that performs the frequency conversion of the wireless signal, a modulation and demodulation unit that performs the modulation and the demodulation, and a digital signal processing circuit that performs the TDMA signal processing and the like.

Cordless base unit controller 136 transmits and receives control data to and from cordless base unit 10, and performs protocol control in compliance with a control protocol (for example, a DECT protocol scheme, a PHS protocol scheme, or the like) between cordless base unit controller 136 and cordless base unit 10, such as initiating an outgoing call and receiving an incoming call.

Handset controller 137 controls entire cordless handset 30. Specifically, handset controller 137 receives and analyzes an event and a message that occur in each unit in the vicinity of handset controller 137, controls states of outgoing and incoming calls and call connection, and gives an instruction to each unit.

For example, when an incoming call message that includes service information which uses a caller number is received from cordless base unit 10 at the time of an arrival of the incoming call at the landline telephone network, control is performed in such a manner that a predetermined sound for the incoming call rings, service information that is given to the incoming call message is extracted, the service information is stored in predetermined memory area of memory 131 whenever necessary, the service information is displayed, as a display screen indicating that the incoming call is arriving, on LCD section 134, and so forth.

Configuration of the Mobile Information Terminal

Figure 4:
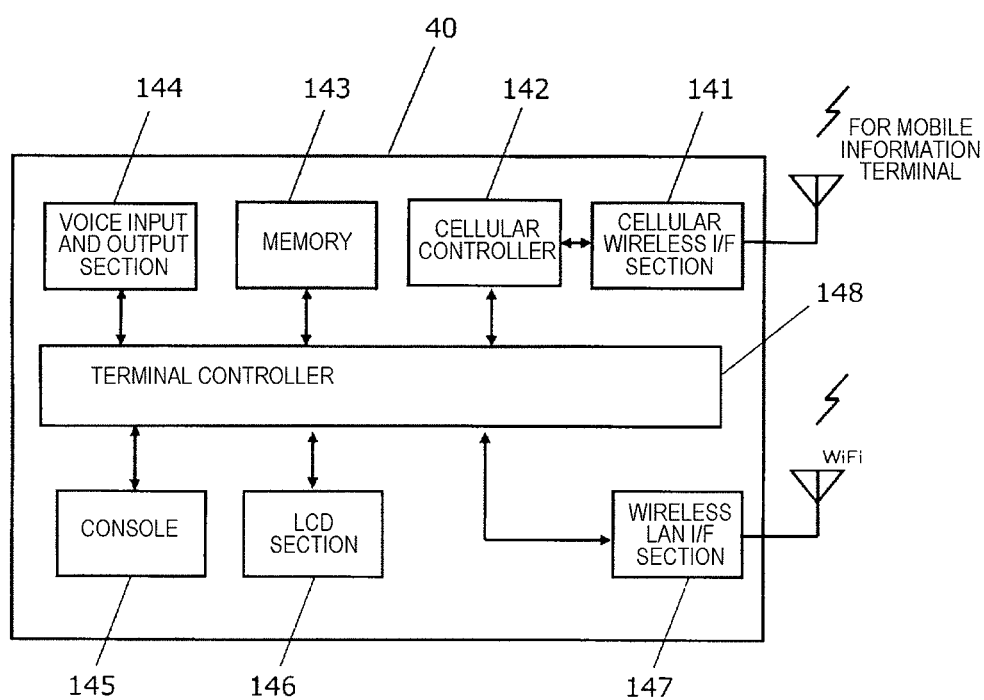
FIG. 4 is a block diagram of a mobile information terminal of the cordless telephone system according to the first exemplary embodiment of the present invention.

FIG. 4 is a block diagram of the mobile information terminal of the cordless telephone system according to the first exemplary embodiment. A configuration of mobile information terminal 40 will be described below referring to FIG. 4.

Cellular wireless I/F section 141 transmits and receives wireless data to and from a mobile base station through a mobile antenna.

Cellular controller 142 transmits and receives control data to and from the mobile base station, and performs protocol control in compliance with a control protocol (for example, a mobile protocol in conformity with widely-known 3GPP standards), such as initiating an outgoing call and receiving an incoming call.

Pieces of information, such as various pieces of setting data of mobile information terminal 40, telephone directory data, outgoing and incoming call history information, an SMS message, various pieces of image data, and music data (including sound data for an incoming call) are stored in memory 143.

Voice input and output section 144 is configured from a microphone and a speaker, and performs output of incoming call sound, and input and output of voice speech.

Console 145 is configured from dials that are turned by the user, and various function buttons. Various pieces of information are displayed on LCD section 146. In a case where mobile information terminal 40 is a smartphone, a touch panel functions as both of console 145 and LCD section 146.

Wireless LAN I/F section 147 performs the wireless LAN protocol control in compliance with IEEE 802.11, and performs transmission and reception of wireless data to and from cordless base unit 10. The short-distance wireless communication technology such as Bluetooth (a registered trademark) or ZigBee (a registered trademark) may be used in conjunction with the cordless base unit 10 side.

Terminal controller 148 controls entire mobile information terminal 40. Specifically, terminal controller 148 receives and interprets an event and a message that occur in each unit in the vicinity of terminal controller 148, controls states of outgoing and incoming calls and call connection, and gives an instruction to each unit.

For example, a call control message that is received from the mobile base station through cellular wireless I/F section 141 is processed. Furthermore, a call control message that is received from cordless base unit 10 through wireless LAN I/F section 147 is processed.

Incoming-Call Calling to Automatic Answering

Figure 5:
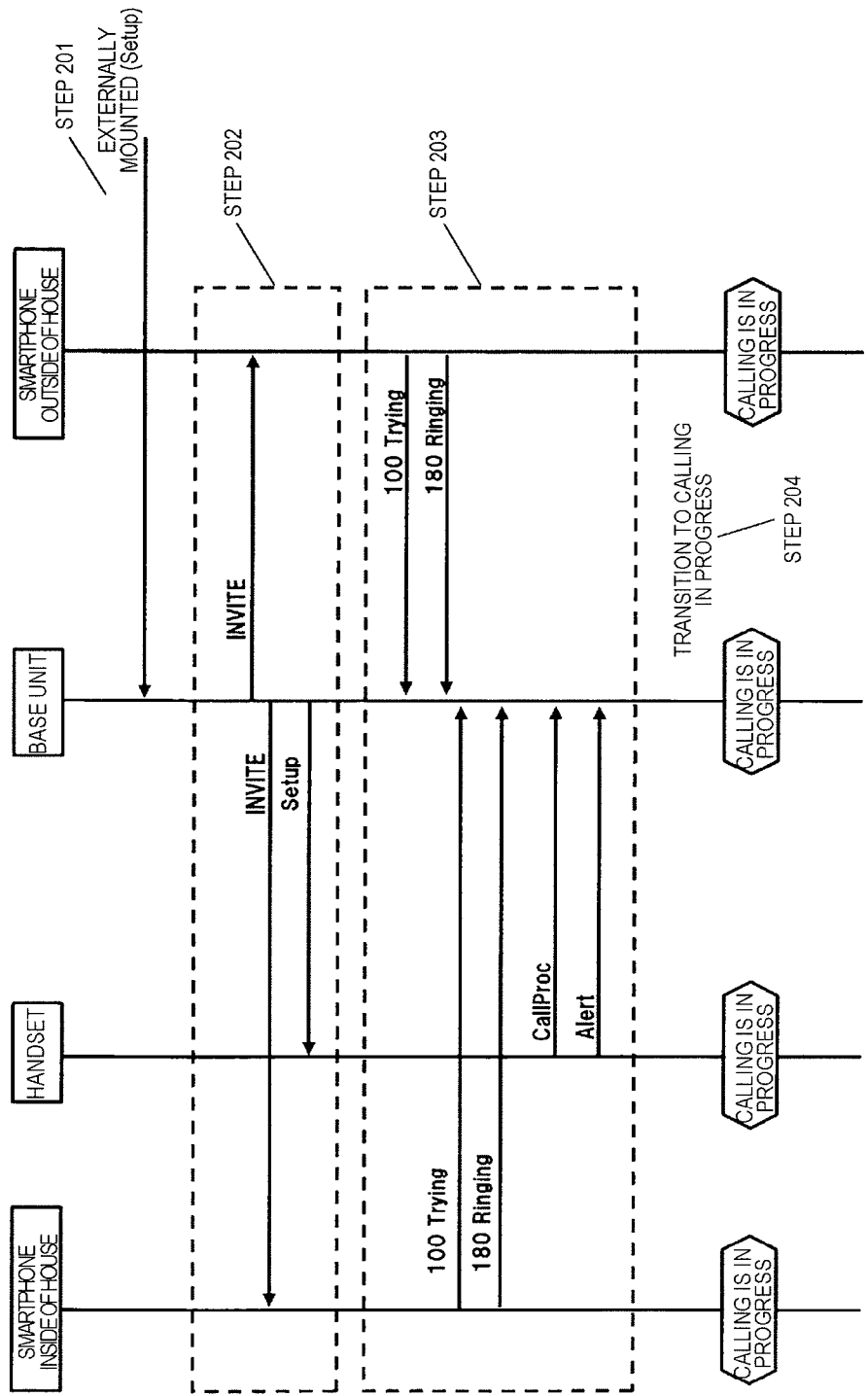
FIG. 5 is a sequence diagram for an incoming-call calling in the cordless telephone system according to the first exemplary embodiment of the present invention.

FIG. 5 is a sequence diagram for an incoming-call calling in the cordless telephone system according to the first exemplary embodiment.

In a case where an incoming call arrives at cordless base unit 10 from the landline telephone network (Step 201), NCU/modem 101 of cordless base unit 10 receive a setup message in conformity with, for example, widely-known Q.931 specifications. Base unit controller 110 confirms a handset that has to receive an incoming call, referring to memory 103.

At this point, cordless handset 30, mobile information terminal 40-1, and mobile information terminal 40-2 as handsets that have to transfer the incoming call are described as being registered in memory 103. Furthermore, as described referring to FIG. 1, mobile information terminal 40-2 illustrates a case where mobile information terminal 40 is outside of the house.

Base unit controller 110 causes cordless base unit 10 itself to transition to a state of the incoming call, and performs incoming call processing on cordless handset 30, mobile information terminal 40-1, and mobile information terminal 40-2 (Step 202).

Processing of the incoming call to cordless handset 30 is performed by transmitting the incoming call message that is equivalent to the setup message in conformity with, for example, the Q.931 specifications described above. Furthermore, the incoming call to mobile information terminal 40 is performed by transmitting the incoming call message using an INVITE message in conformity with, for example, a session initiation protocol (SIP).

In a case of mobile information terminal 40 being inside of the house, that is, mobile information terminal 40-1, a destination of an inside network (LAN) is included in the INVITE message that is transmitted to mobile information terminal 40, and in a case of mobile information terminal 40 being outside of the house, that is, mobile information terminal 40-2, a destination of an outside network (WAN) is included in the INVITE message.

Cordless handset 30, mobile information terminal 40-1, and mobile information terminal 40-2 that receive the incoming call message perform answering in conformity with their respective protocol, and transition to a calling-in-progress state (Step 203). The calling-in-progress state is specifically a state where a caller number is displayed on an LCD and the sound ring for the incoming call is performed, or the like.

Cordless base unit 10 that receives an answer to the incoming call message from each of cordless handset 30, mobile information terminal 40-1, and mobile information terminal 40-2 transitions to the calling-in-progress state (Step 204).

Figure 6:
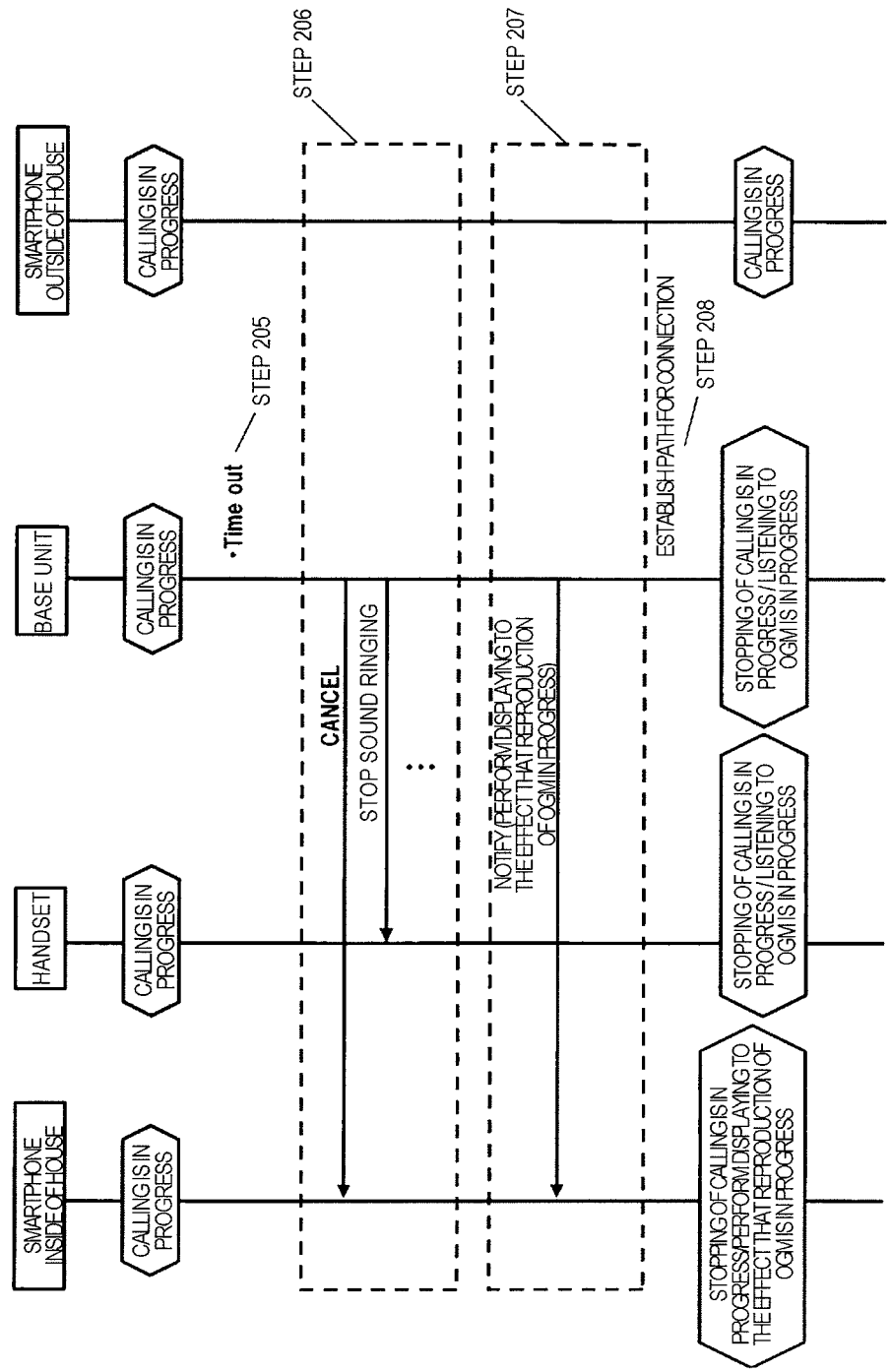
FIG. 6 is a sequence diagram for automatic answering in the cordless telephone system according to the first exemplary embodiment of the present invention.

FIG. 6 is a sequence diagram for automatic answering in the cordless telephone system according to the first exemplary embodiment.

Even if a predetermined amount of time has elapsed, in a case where an answering operation is not performed by the user in cordless handset 30, mobile information terminal 40-1, mobile information terminal 40-2 and cordless base unit 10 itself (Step 205), cordless base unit 10 that transitions to the calling-in-progress state performs the automatic answering using the answering machine message that is described below.

Prior to the automatic answering, cordless base unit 10 stops the sound ringing for the incoming call for cordless base unit 10 itself, and performs processing that stops the sound ringing for the incoming call, on cordless handset 30 and mobile information terminal 40-1 (Step 206).

The processing that stops the sound ringing for the incoming call for cordless handset 30 is performed by transmitting an information element indicating the stopping of the sound ringing for the incoming call in a state of being included in, for example, an interval message or a message equivalent to an Info message in conformity with the Q.931 specifications described above. Furthermore, the processing that stops the sound ringing for the incoming call for mobile information terminal 40-1 is performed by transmitting a CANCEL message in conformity with, for example, the SIP.

At this point, what is characteristic of the cordless telephone system according to the first exemplary embodiment is that in a case where the automatic answering is performed, the processing that stops the sound ringing for the incoming call is not performed on mobile information terminal 40 outside of the house, that is, mobile information terminal 40-2. A detailed description is provided below.

Cordless base unit 10 performs processing that performs displaying to the effect that the automatic answering is in progress, on mobile information terminal 40 inside of the house, that is, mobile information terminal 40-1 (Step 207).

The processing that performs the displaying to the effect that the automatic answering to mobile information terminal 40-1 is in progress is performed by transmitting an information element indicating that the displaying is performed to the effect that the automatic answering is in progress, in a state of being included in, for example, a NOTIFY message in conformity with the SIP.

Lastly, cordless base unit 10 controls TAM section 102, and thus starts operations of recording and reproducing the answering machine message and performs control in such a manner that voice paths for connection between TAM section 102 and cordless base unit 10 itself, between TAM section 102 and the landline telephone network, and between TAM section 102 cordless handset 30 are established and the answering machine message is audible (Step 208). Transition to a state where listening to the answering machine message is in progress takes place while stopping the calling.

Figure 7:
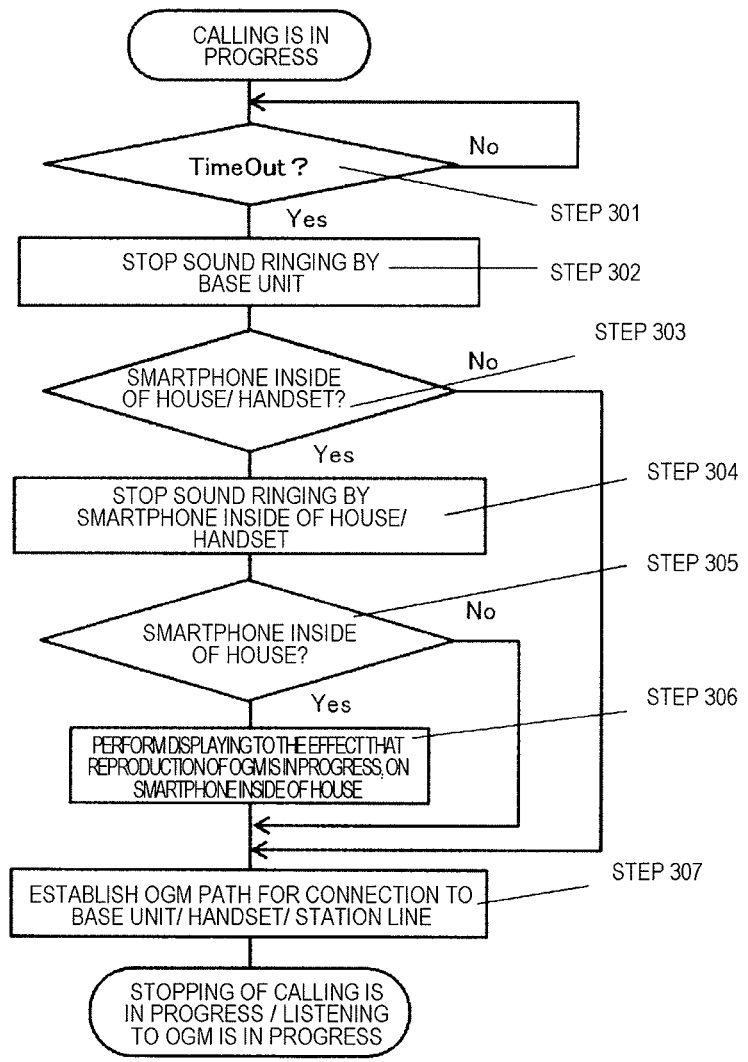
FIG. 7 is a flow diagram illustrating an automatic answering operation by the base unit of the cordless telephone system according to the first exemplary embodiment of the present invention.

FIG. 7 is a flowchart illustrating an automatic answering operation by the base unit of the cordless telephone system according to the first exemplary embodiment.

Referring to FIG. 7, the automatic answering operation that is performed by cordless base unit 10 even while the automatic answering operation by the cordless telephone system, which is described referring to FIG. 6, is in progress, is further described in detail.

Cordless base unit 10 that transitions to the calling-in-progress state determines whether or not a predetermined amount of time has elapsed (Step 301). At this point, the elapsed predetermined amount of time is not limited to timeout of a timer (not illustrated). For example, if there is a condition that the sound ringing for the incoming call should repeat four times, a determination of whether or not the sound ringing for the incoming call repeats four times is included. A condition may be set to be in memory 103 in advance as an initial value of a device, and the user may set a condition to be a parameter using console 105.

In Step 301, if a predetermined amount of time did not elapse, waiting is necessary until the predetermined amount of time has elapsed (No in Step 301). If the predetermined amount of time has elapsed (Yes in Step 301), first, the sound ringing for the incoming call in cordless base unit 10 itself, which is originated from sound input and output unit 104, is stopped (Step 302).

Cordless base unit 10 refers to information (including information on a mobile information terminal that is registered as the handset, and outside-of-the-house and inside-of-the-house information on the mobile information terminal) on a registered handset, which is stored in memory 103, and a current state of the registered handset (Step 303).

In Step 303, if a mobile information terminal outside of the house in the calling-in-progress state (in a state where the sound ringing for the incoming call is in progress) is present (No in Step 303), proceeding to Step 307 takes place without a state of the mobile information terminal outside of the house being changed, that is, with the sound ringing for the incoming call being performed.

In Step 303, if a handset in the calling-in-process state (in the state where the sound ringing for the incoming call is in progress) or the mobile information terminal inside of the house is present (Yes in Step 303), a message for stopping the sound ringing for the incoming call is transmitted through cordless handset wireless I/F section 107 or wireless LAN I/F section 109, and the sound ringing for the incoming call for the handset or the mobile information terminal is stopped (Step 304).

It is determined whether or not the registered handset, the sound ringing for which is stopped, is a mobile information terminal inside of the house (Step 305). If the registered handset, the sound ringing for which is stopped, is the mobile information terminal inside of the house (Yes in Step 305), a message for performing the displaying to the effect that the automatic answering is in progress is transmitted to the mobile information terminal inside of the house through wireless LAN I/F section 109, and processing that performs the displaying to the effect that the automatic answering is in progress is performed (Step 306).

Lastly, cordless base unit 10 causes TAM section 102 to start recoding and reproducing the answering machine message, and establishes voice paths for connection between TAM section 102 and cordless base unit 10 itself, between TAM section 102 and cordless handset 30, and between TAM section 102 and the landline telephone network (Step 307).

The answering machine message, for example, is an answering message that says "I cannot answer your call right now," which is heard by a caller, and is referred to as an outgoing message (OGM). Furthermore, a message that is left by the caller who heard such an OGM reproduction message is referred to as an incoming message (ICM).

When the voice path for connection between TAM section 102 and cordless base unit 10 itself is established, the OGM reproduction message from TAM section 102 is issued from sound input and output unit 104. When the voice path for connection between TAM section 102 and cordless handset 30 is established, the OGM reproduction message from TAM section 102 is transmitted to cordless handset 30 through cordless handset wireless I/F section 107.

When the voice path for connection between TAM section 102 and the landline telephone network is established, the OGM reproduction message from TAM section 102 is transmitted to the caller that is linked to the public communication line, through NCU/modem 101. Furthermore, an ICM recording message from the caller, which is received through NCU/modem 101, is recorded in TAM section 102.

Cordless base unit 10 itself transitions to a calling-not-in-progress state (a state where listening to the answering machine message is in progress).

In a case where the automatic answering is performed in this manner, the processing that stops the sound ringing for the incoming call is performed on cordless handset 30 or mobile information terminal 40-1 inside of the house, but the processing that stops the sound ringing for the incoming call is not performed on mobile information terminal 40 outside of the house, that is, mobile information terminal 40-2.

As described above, in a process in which cordless base unit 10 in the calling-in-progress state transitions to the calling-not-in-progress state (the state where the listening to the answering machine message is in progress), after a predetermined amount of time has elapsed, the sound ringing for the incoming call for the cordless base unit 10 itself is first stopped, but the order in which the displaying to the effect that the sound ringing for the incoming call is stopped and the displaying to the effect that the automatic answering is in progress are performed is not limited to this. For example, before the sound ringing for the incoming call for cordless base unit 10 itself is stopped, the sound ringing for the incoming call for the handset or the mobile information terminal inside of the house may be stopped.

Figure 8:
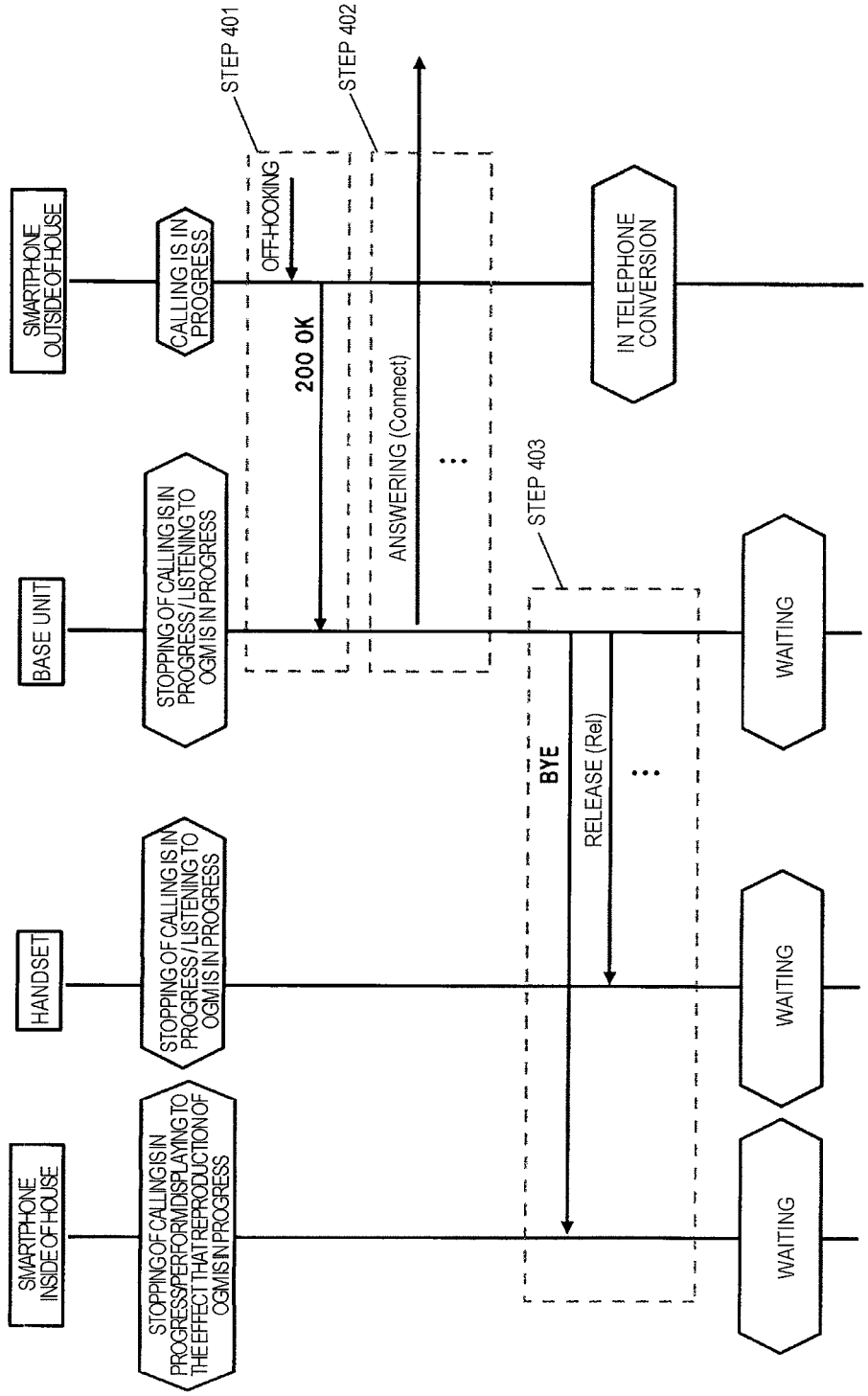
FIG. 8 is an answering sequence diagram of the mobile information terminal outside of a house when the automatic answering is performed in the cordless telephone system according to the first exemplary embodiment of the present invention.

Automatic Answering to Answering by the Mobile Information Terminal Outside of the House FIG. 8 is an answering sequence diagram of the mobile information terminal outside of the house when the automatic answering is performed in the cordless telephone system according to the first exemplary embodiment.

Mobile information terminal 40 outside of the house in the calling-in-progress state (the state where the sound ringing for the incoming call is in progress), that is, mobile information terminal 40-2, when the user answers the calling by off-hooking, an answering message "200 OK" is transferred to cordless base unit 10 (Step 401).

Cordless base unit 10 that receives the answering message "200 OK" performs processing that answers incoming call, on the landline telephone network (Step 402), releasing processing is performed on mobile information terminal 40-1 and cordless handset 30 that, while stopping the calling, are in the state where the listening to the answering machine message is in progress (Step 403).

Processing that answers the incoming call is performed by cordless base unit 10 transmitting, for example, a CONNECT message that indicates an answer to the incoming call toward the landline telephone network.

The releasing processing is performed by cordless base unit 10 transmitting, for example, a BYE message toward mobile information terminal 40-1. In the same manner, the releasing processing is performed by transmitting, for example, a Rel message toward cordless handset 30.

Mobile information terminal 40-2 is in a state of communicating with the landline telephone network, and mobile information terminal 40-1 and cordless handset 30 transition to a waiting state. Moreover, cordless base unit 10 itself transitions to the waiting state.

Matching Using the Elapsed Time when the Automatic Answering is Performed

Figure 9:
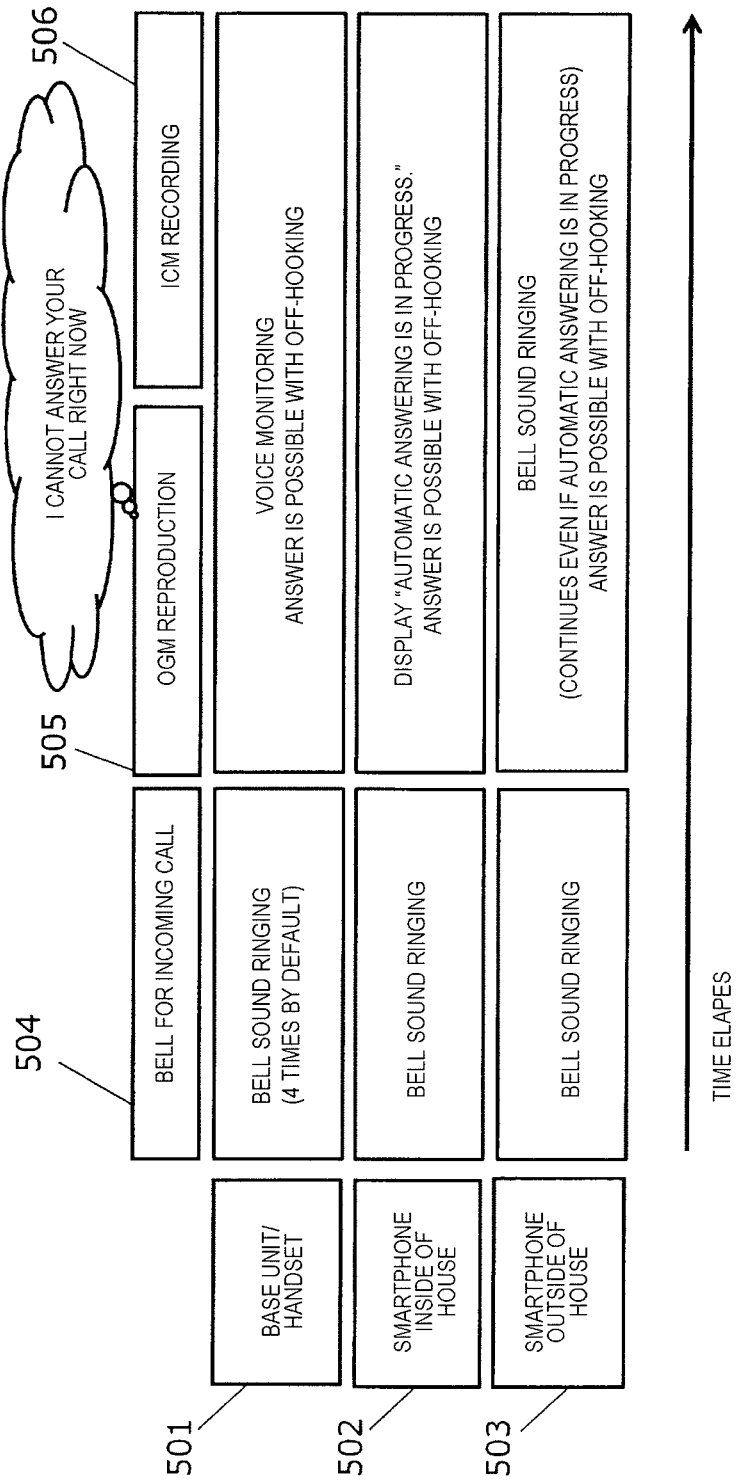
FIG. 9 is a diagram illustrating matching that is established when the automatic answering is performed in the cordless telephone system according to the first exemplary embodiment of the present invention.

FIG. 9 is a diagram illustrating matching that is established when the automatic answering is performed in the cordless telephone system according to the first exemplary embodiment.

FIG. 9 illustrates one example of an operation that is performed by mobile information terminal 40-1 or the like in a matching manner with the elapsed time from the arrival of the incoming call, such as OGM reproduction.

Cordless base unit 10 and cordless handset 30 that are indicated by reference numeral 501 repeat bell sound ringing four times by default during a bell period for the incoming call that is indicated by reference number 504. If an answer to the incoming call is not present during this period, the bell sound ringing is stopped, and movement to a period for OGM reproduction that is indicated by reference number 505 takes place.

During the period for OGM reproduction that is indicated by reference 505, OGM reproduction voice is monitored, and if an answer to the incoming call due to off-hooking is present in cordless base unit 10 or cordless handset 30, it is possible to receive the incoming call. If the answer to the incoming call is not present during the period for OGM reproduction, movement to a period for ICM recording that is indicated by reference number 506 takes place.

During the period for ICM recording that is indicated by reference numeral 506, ICM recording voice is monitored, and if a response occurs due to off-hooking in cordless base unit 10 or cordless handset 30, it is possible to receive the incoming call. If the answer to the incoming call is not present during the period for ICM recording, the incoming call is disconnected.

Mobile information terminal 40-1 inside of the house that is indicated by reference number 502 repeats the bell sound ringing for a predetermined amount of time (which, at this point, is matched to a period in which cordless base unit 10 and cordless handset 30 perform the bell sound ringing) during the bell period for the incoming call that is indicated by reference numeral 504. If the answer to the incoming call is not present during this period, the bell sound ringing is stopped, and the movement to the period for OGM reproduction that is indicated by reference number 505 takes place.

During the period for OGM reproduction that is indicated by reference numeral 505, "The answering machine is answering" is displayed, and if the answer to the incoming call occurs due to off-hooking in mobile information terminal 40-1, it is possible to receive the incoming call. If the answer to the incoming call is not present during the period for OGM reproduction, the movement to the period for ICM recording that is indicated by reference number 506 takes place.

During the period for ICM recording that is indicated by reference numeral 506, "The answering machine is answering" is displayed, and if the answer occurs due to off-hooking in mobile information terminal 40-1, it is possible to receive the incoming call. If the answer to the incoming call is not present during the period for ICM recording, the incoming call is disconnected.

Mobile information terminal 40-2 outside of the house that is indicated by reference number 503 repeats the bell sound ringing for a predetermined amount of time (at this point, a period of time for which cordless base unit 10 and cordless handset 30 perform the bell sound ringing) during the bell period for the incoming call that is indicated by reference number 504. If the answer to the incoming call is not present during this period, the bell sound ringing is not stopped, and the movement to the period for OGM reproduction that is indicated by reference number 505 takes place.

During the period for OGM reproduction that is indicated by reference numeral 505, the bell sound ringing continues, and if the answer to the incoming call due to off-hooking is present in mobile information terminal 40-2, it is possible to receive the incoming call. If the answer to the incoming call is not present during the period for OGM reproduction, movement to the period for ICM recording that is indicated by reference number 506 takes place.

During the period for ICM recording that is indicated by reference numeral 506, the bell sound ringing continues, and if the answer occurs due to off-hooking in mobile information terminal 40-2, it is possible to receive the incoming call. If the answer to the incoming call is not present during the period for ICM recording, the incoming call is disconnected.

As described above, with the cordless telephone apparatus, even if the base unit of the cordless telephone apparatus is answering with the answering machine, because the mobile information terminal carried outside of the house continues to perform the sound ringing for the incoming call until the answering with the answering machine is ended, the user can answer the incoming call without losing an answering opportunity.

Second Exemplary Embodiment

According to a second exemplary embodiment, a modification example of the operation that is performed when the automatic answering is performed in the cordless telephone system that is described according to the first exemplary embodiment is described.

Figure 10:
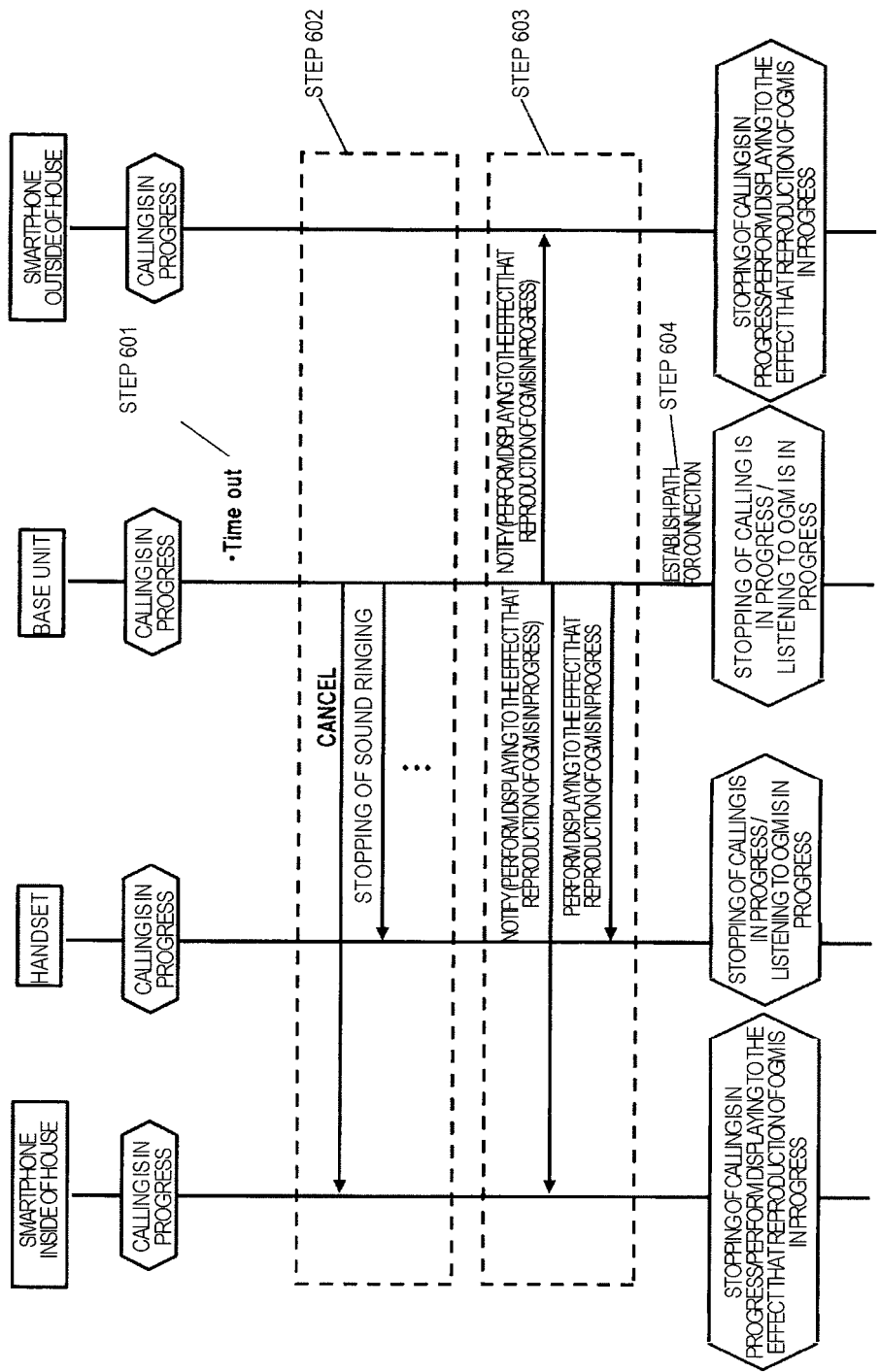
FIG. 10 is a sequence diagram for automatic answering in a cordless telephone system according to a second exemplary embodiment of the present invention.

Modification Example of the Operation that is Performed when the Automatic Answering is Performed FIG. 10 is a sequence diagram for automatic answering in a cordless telephone system according to a second exemplary embodiment. An operation that is performed when the automatic answering is performed is described below referring to the sequence diagram in FIG. 10. Because an operation that is performed until a stage of incoming-call calling is reached is as described referring to FIG. 5, a description thereof is omitted, and a description of a portion that overlaps the portion of FIG. 6 that is referred to in order to describe the operation that is performed when the automatic answering is performed is simplified.

Even if a predetermined amount of time has elapsed, in a case where an answering operation is not performed by the user in cordless handset 30, mobile information terminal 40-1, mobile information terminal 40-2 and cordless base unit 10 itself (Step 601), cordless base unit 10 that transitions to the calling-in-progress state performs the automatic answering using the answering machine message that is described below.

Prior to the automatic answering, cordless base unit 10 stops the sound ringing for the incoming call for cordless base unit 10 itself, and performs processing that stops the sound ringing for the incoming call, on cordless handset 30 and mobile information terminal 40-1 (Step 602).

At this point, what is firstly characteristic of the cordless telephone system according to the second exemplary embodiment, as described according to the first exemplary embodiment, is that in a case where the automatic answering is performed, the processing that stops the sound ringing for the incoming call is not performed on mobile information terminal 40 outside of the house, that is, mobile information terminal 40-2.

Next, cordless base unit 10 performs processing that performs the displaying to the effect that the automatic answering is in progress, on mobile information terminal 40-2 and cordless handset 30 in addition to the mobile information terminal 40-1 (Step 603).

At this point, what is secondly characteristic of the cordless telephone system according to the second exemplary embodiment is that in a case where the automatic answering is performed, the displaying to the effect that the automatic answering is in progress can be performed on mobile information terminal 40-2 while the mobile information terminal 40 outside of the house, that is, the mobile information terminal 40-2, is caused to continue to perform the sound ringing for the incoming call.

As described according to the first exemplary embodiment, the processing that performs the displaying to the effect that the automatic answering to mobile information terminal 40-2 is in progress, is also performed by transmitting an information element indicating that the displaying to the effect that the automatic answering is in progress is performed, in a state of being included in, for example, a NOTIFY message in conformity with the SIP. The processing that performs the displaying to the effect that the automatic answering to cordless handset 30 is in progress is performed by transmitting an information element indicating that the displaying to the effect that the automatic answering is in progress is performed, in a state of being included in an internal message or a message equivalent to the Info message in conformity with the Q.931 specifications.

Lastly, cordless base unit 10 controls TAM section 102, and thus starts operations of recording and reproducing the answering machine message and performs control in such a manner that voice paths for connection between TAM section 102 and cordless base unit 10 itself, between TAM section 102 and the landline telephone network, and between TAM section 102 and cordless handset 30 are established and the answering machine message is audible (Step 604). Transition to a state where listening to the answering machine message is in progress takes place while stopping the calling.

Figure 11:
FIG. 11 is a flow diagram illustrating an automatic answering operation by the base unit of the cordless telephone system according to the second exemplary embodiment of the present invention.

FIG. 11 is a flowchart illustrating an automatic answering operation by the base unit of the cordless telephone system according to the second exemplary embodiment.

Referring to FIG. 11, the automatic answering operation that is performed by cordless base unit 10 even while the automatic answering operation by the cordless telephone system, which is described referring to FIG. 10, is in progress, is further described in detail. A description of a portion that overlaps the portion of FIG. 7 is simplified.

Cordless base unit 10 that transitions to the calling-in-progress state determines whether or not a predetermined amount of time has elapsed (Step 701).

In Step 701, if the predetermined amount of time did not elapse, waiting is necessary until the predetermined has elapsed (No in Step 701). If the predetermined amount of time elapsed (Yes in Step 701), the sound ringing for the incoming call in cordless base unit 10 itself is stopped (Step 702).

Cordless base unit 10 refers to information (including information on a mobile information terminal that is registered as the handset, and outside-of-the-house and inside-of-the-house information on the mobile information terminal) on a registered handset, which is stored in memory 103, and a current state of the registered handset (Step 703).

In Step 703, if a mobile information terminal outside of the house in the calling-in-progress state (in the state where the sound ringing for the incoming call is in progress) is present (No in Step 703), a message for performing the displaying to the effect that the automatic answering is in progress is transmitted through wireless LAN I/F section 109, and the displaying to the effect that the automatic answering is in progress is performed without a state of the mobile information terminal being changed, that is, with the sound ringing for the incoming call being performed (Step 704).

In Step 703, if a handset in the calling-in-process state (in the state where the sound ringing for the incoming call is in progress) or the mobile information terminal inside of the house is present (Yes in Step 703), a message for stopping the sound ringing for the incoming call is transmitted through cordless handset wireless I/F section 107 or wireless LAN I/F section 109, and the sound ringing for the incoming call for the handset or the mobile information terminal is stopped (Step 705).

A message for performing the displaying to the effect that the automatic answering is in progress is transmitted to the handset or the mobile information terminal through cordless handset wireless I/F section 107 or wireless LAN I/F section 109, and process that performs the displaying to the effect that the automatic answering is in progress is performed (Step 706).

Lastly, cordless base unit 10 causes TAM section 102 to start recoding and reproducing the answering machine message, and establishes voice paths for connection between TAM section 102 and cordless base unit 10 itself, between TAM section 102 and cordless handset 30, and between TAM section 102 and the landline telephone network (Step 707).

Cordless base unit 10 itself transitions to a calling-not-in-progress state (a state where listening to the answering machine message is in progress).

In a case where the automatic answering is performed in this manner, the processing that stops the sound ringing for the incoming call is performed on cordless handset. 30 or mobile information terminal 40-1 inside of the house, but the processing that stops the sound ringing for the incoming call is not performed on mobile information terminal 40-2 outside of the house.

Furthermore, in a case where the automatic answering is performed, the displaying to the effect that the automatic answering is in progress is performed on mobile information terminal 40-2 while the mobile information terminal 40-2 outside of the house is caused to continue to perform the sound ringing for the incoming call.

Thereafter, because an operation of answering to the incoming call by mobile information terminal 40-2 outside of the house when the automatic answering is performed is as described referring to the sequence diagram for answering in FIG. 8, a description thereof is omitted.

Figure 12:
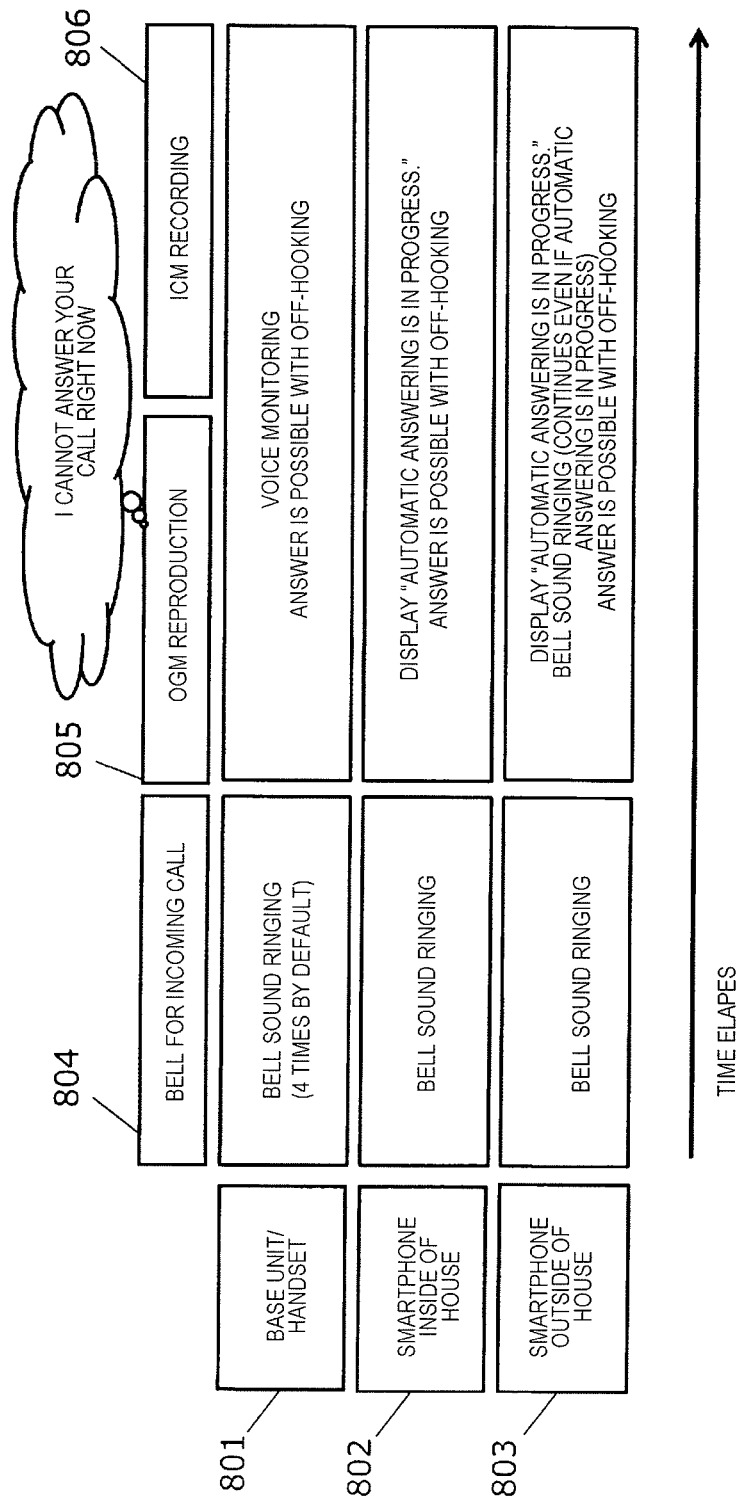
FIG. 12 is a diagram illustrating matching that is established when the automatic answering is performed in the cordless telephone system according to the second exemplary embodiment of the present invention.

Matching Using the Elapsed Time when the Automatic Answering is Performed According to a Modification Example FIG. 12 is a diagram illustrating matching that is established when the automatic answering is performed in the cordless telephone system according to the second exemplary embodiment. A description of a portion that overlaps the portion of FIG. 9 that is referred to in order to describe the matching that is established when the automatic answering is performed is simplified.

FIG. 12 illustrates one example of an operation that is performed by each of cordless base unit 10 and cordless handset 30 that are indicated by reference numeral 801, mobile information terminal 40-1 that is indicated by reference numeral 802, and mobile information terminal 40-2 outside of the house that is indicated by reference numeral 803, in a matching manner with the elapsed time from the arrival of the incoming call, such as OGM reproduction.

Cordless base unit 10 and cordless handset 30 that are indicated by reference numeral 801 repeats bell sound ringing during a bell period for the incoming call that is indicated by reference number 804. If an answer to the incoming call is not present during this period, the bell sound ringing is stopped, and movement to a period for OGM reproduction that is indicated by reference number 805 takes place.

Although not distinctively illustrated in FIG. 12, during the bell period for the incoming call that is indicated by reference number 804, the answer to the incoming call is possible (the answer to the incoming call is also possible in the same manner in cases of mobile information terminal 40-1 inside of the house that is indicated by reference numeral 802 and of mobile information terminal 40-2 outside of the house that is indicated by reference numeral 803).

During the period for OGM reproduction that is indicated by reference 805, OGM reproduction voice is monitored, and if an answer to the incoming call due to off-hooking is present in cordless base unit 10 or cordless handset 30, it is possible to receive the incoming call. If the answer to the incoming call is not present during the period for OGM reproduction, movement to a period for ICM recording that is indicated by reference number 806 takes place.

During the period for ICM recording that is indicated by reference numeral 806, ICM recording voice is monitored, and if an answer due to off-hooking is present in cordless base unit 10 or cordless handset 30, it is possible to receive the incoming call. If the answer to the incoming call is not present during the period for ICM recording, the incoming call is disconnected.

During the periods for OGN reproduction and for ICM recording, "The answering machine is answering" may be displayed in such a manner that even if a soundless state is maintained, it is recognized that the answering machine is answering. The displaying may be simply realized as blinking of a light emitting diode (LED) and the like.

Mobile information terminal 40-1 inside of the house that is indicated by reference number 802 repeats the bell sound ringing for a predetermined amount of time during the bell period of the incoming call that is indicated by reference number 804. If an answer to the incoming call is not present during this period, the bell sound ringing is stopped, and movement to a period for OGM reproduction that is indicated by reference number 805 takes place.

During the period for OGM reproduction that is indicated by reference numeral 805, "The answering machine is answering" is displayed, and if the answer to the incoming call occurs due to off-hooking in mobile information terminal 40-1, it is possible to receive the incoming call. If the answer to the incoming call is not present during the period for OGM reproduction, movement to a period for ICM recording that is indicated by reference number 806 takes place.

During the period for ICM recording that is indicated by reference numeral 806, "The answering machine is answering" is displayed, and if the answering occurs due to off-hooking in mobile information terminal 40-1, it is possible to receive the incoming call. If the answer to the incoming call is not present during the period for ICM recording, the incoming call is disconnected.

During the periods for OGM reproduction and for ICM recording, pieces of sound data for OGM reproduction and ICM recording may be sequentially transmitted from cordless base unit 10 to mobile information terminal 40-1 and may be output from mobile information terminal 40-1, in such a manner that even if "The answering machine is answering" is displayed, it is recognized that the answering machine is answering.

Mobile information terminal 40-2 outside of the house that is indicated by reference number 803 repeats the bell sound ringing for a predetermined amount of time during the bell period of the incoming call that is indicated by reference number 804. If the answer to the incoming call is not present during this period, the bell sound ringing is not stopped, and the movement to the period for OGM reproduction that is indicated by reference number 805 takes place.

During the period for OGM reproduction that is indicated by reference numeral 805, "The answering machine is answering" is displayed, and the bell sound ringing continues, and if the answer to the incoming call occurs due to off-hooking in mobile information terminal 40-2, it is possible to receive the incoming call. If the answer to the incoming call is not present during the period for OGM reproduction, the movement to the period for ICM recording that is indicated by reference number 806 takes place.

During the period for ICM recording that is indicated by reference numeral 806, "The answering machine is answering" is displayed and the bell sound ringing continues, and if the answering occurs due to off-hooking in mobile information terminal 40-2, it is possible to receive the incoming call. If the answer to the incoming call is not present during the period for ICM recording, the incoming call is disconnected.

Sound monitoring may be set to be performed with first-time off-hooking and the answering may be set to be performed with second-time off-hooking in such a manner that even during the periods for OGM reproduction and for ICM recording, sound monitoring is possible.

As described above, with the cordless telephone apparatus, even if the base unit of the cordless telephone apparatus is answering with the answering machine, because the mobile information terminal carried outside of the house continues to perform the sound ringing for the incoming call until the answering with the answering machine is ended, the user can answer the incoming call without losing an answering opportunity.

Furthermore, because even if the sound ringing for the incoming call is being performed, the displaying to the effect that the base unit is being automatically answering is performed on the mobile information terminal outside of the house that is performing the sound ringing for the incoming call, the user can answer the incoming call while recognizing that the base unit is being automatically answering.

What is claimed is:

1. A cordless telephone apparatus comprising:
   a cordless base unit that is connected to a landline telephone network,
   wherein the cordless base unit includes:
   a first wireless communicator that wirelessly connects to a cordless handset,
   a second wireless communicator that wirelessly connects to a mobile information terminal,
   a memory in which setting information on whether the mobile information terminal is used outside of or inside of a house is stored, and
   a controller that performs control when an incoming call arrives from the landline telephone network, such that
   both the cordless handset and the mobile information terminal perform sound ringing for the incoming call,
   automatic answering starts after a predetermined time has elapsed and the sound ringing for the incoming call is stopped for the cordless handset, but the mobile information terminal that is set to be used outside of the house continues ringing after the predetermined time has elapsed, such that during a time frame in which the automatic answering is performed by the cordless handset, the mobile information terminal that is set to be used outside of the house continues to perform the sound ringing for the incoming call,
   wherein the setting information regarding whether the mobile information terminal is used outside of or inside of the house is inputted manually.

2. The apparatus of claim 1,
   wherein the controller displays that the automatic answering is in progress, on the mobile information terminal that is set to be used outside of the house while the sound ringing for the incoming call continues.

3. The apparatus of claim 1,
   wherein whether or not the mobile information terminal is used inside of or outside of the house is set using a button that is provided on the cordless telephone apparatus.

4. The apparatus of claim 1,
   wherein it is determined whether or not the sound ringing for the incoming call is repeated a predetermined number of times, and
   wherein when it is determined that the sound ringing for the incoming call is repeated the predetermined number of times, the automatic answering starts and the sound ringing for the incoming call is stopped except for the mobile information terminal that is set to be used outside of the house.

5. The apparatus of claim 1,
   wherein the controller first stops the sound ringing for the incoming call in the cordless handset and the mobile information terminal inside of the house, and thereafter stops the sound ringing for the incoming call in the cordless base unit.

6. The apparatus of claim 1,
wherein after the mobile information terminal that is set to be used inside of the house is caused to stop the sound ringing, the controller performs displaying to the effect that the automatic answering is in progress, along with the cordless handset.

7. The apparatus of claim 1,
wherein identification information on the cordless handset and a connected state of each of the cordless handsets is stored in the memory.

8. The apparatus of claim 1, wherein the setting information comprises user setting information.

9. A cordless telephone system comprising:
a cordless base unit that is connected to a landline telephone network,
a cordless handset; and
a mobile information terminal,
wherein the cordless base unit includes:
a first wireless communicator that wirelessly connects to a cordless handset,
a second wireless communicator that wirelessly connects to a mobile information terminal,
a memory in which setting information on whether the mobile information terminal is used outside of or inside of a house is stored, and
a controller that performs control when an incoming call arrives from the landline telephone network, such that
both the cordless handset and the mobile information terminal perform sound ringing for the incoming call,
automatic answering starts after a predetermined time has elapsed and the sound ringing for the incoming call is stopped for the cordless handset, but the mobile information terminal that is set to be used outside of the house continues ringing after the predetermined time has elapsed, such that during a time frame in which the automatic answering is performed by the cordless handset, the mobile information terminal that is set to be used outside of the house continues to perform the sound ringing for the incoming call,
wherein the setting information regarding whether the mobile information terminal is used outside of or inside of the house is inputted manually.

10. The cordless telephone system of claim 9, wherein the setting information comprises user setting information.

11. A communication method for use in a cordless telephone system which includes a cordless base unit that is connected to a landline telephone network, a cordless handset, and a mobile information terminal, the cordless base unit including a first wireless communicator that wirelessly connects to a cordless handset, a second wireless communicator that wirelessly connects to a mobile information terminal, a memory in which setting information on whether the mobile information terminal is used outside of or inside of a house is stored, the method comprising:
causing the cordless base unit to perform control when an incoming call arrives from the landline telephone network, such that
both the cordless handset and the mobile information terminal perform sound ringing for the incoming call,
automatic answering starts after a predetermined time has elapsed and the sound ringing for the incoming call is stopped for the cordless handset, but the mobile information terminal that is set to be used outside of the house continues ringing after the predetermined time has elapsed, such that during a time frame in which the automatic answering is performed by the cordless handset, the mobile information terminal that is set to be used outside of the house continues to perform the sound ringing for the incoming call,
wherein the setting information regarding whether the mobile information terminal is used outside of or inside of the house is inputted manually.

12. The communication method of claim 11, wherein the setting information comprises user setting information.

\* \* \* \* \*